United States Patent
Wade et al.

(10) Patent No.: US 9,995,641 B2
(45) Date of Patent: Jun. 12, 2018

(54) FORCE SENSOR WITH GAP-CONTROLLED OVER-FORCE PROTECTION

(71) Applicant: Honeywell International Inc., Morris Plains, NJ (US)

(72) Inventors: Richard A. Wade, Worthington, OH (US); James D. Cook, Worthington, OH (US)

(73) Assignee: Honeywell International Inc., Morris Plains, NJ (US)

( * ) Notice: Subject to any disclaimer, the term of this patent is extended or adjusted under 35 U.S.C. 154(b) by 0 days. days.

(21) Appl. No.: 15/032,236

(22) PCT Filed: Oct. 1, 2014

(86) PCT No.: PCT/US2014/058584
§ 371 (c)(1),
(2) Date: Apr. 26, 2016

(87) PCT Pub. No.: WO2015/065639
PCT Pub. Date: May 7, 2015

(65) Prior Publication Data
US 2016/0273977 A1 Sep. 22, 2016

Related U.S. Application Data

(60) Provisional application No. 61/897,389, filed on Oct. 30, 2013.

(51) Int. Cl.
*G01L 1/22* (2006.01)
*G01L 1/18* (2006.01)
(Continued)

(52) U.S. Cl.
CPC .................. *G01L 1/18* (2013.01); *G01L 1/16* (2013.01); *G01L 19/06* (2013.01); *G01L 19/0618* (2013.01)

(58) Field of Classification Search
CPC ... G01L 1/18; G01L 1/16; G01L 19/06; G01L 19/0618
(Continued)

(56) References Cited

U.S. PATENT DOCUMENTS 8,316,725 B2 * 11/2012 Wade ........................ G01L 1/18
73/760
8,350,345 B2 * 1/2013 Vaganov ............... G06F 3/0338
257/415

(Continued)

FOREIGN PATENT DOCUMENTS

EP 1519173 A1 3/2005
WO 2015065639 A1 5/2015

OTHER PUBLICATIONS

International Search Report, PCT/US2014/058584, Jan. 20, 2015, 2 pages.
(Continued)

Primary Examiner — Max Noori
(74) Attorney, Agent, or Firm — Honeywell International Inc.

(57) ABSTRACT

Apparatus and associated methods relate to a force sensor having flip-chip mounted force-sensing die having a force-sensing element fabricated on an unflipped top surface and an unflipped back surface being thinned so as to create a flexible diaphragm responsive to an externally applied force, wherein, when the force-sensing die is flipped and mounted, a predetermined space remains between the top surface of the force-sensing die and the mounting substrate it faces, the substrate presenting a deflection limitation for the deformation of the flexible membrane during a force event. In an illustrative embodiment, the force sensor may have a mechanical stop to precisely establish a predetermined deflection limitation. In some embodiments, the predeter-
(Continued)

mined deflection limitation may advantageously limit the deflection of the flexible membrane so as not to deflect beyond a breaking point.

20 Claims, 7 Drawing Sheets

(51) Int. Cl.
  *G01L 19/06* (2006.01)
  *G01L 1/16* (2006.01)
(58) Field of Classification Search
  USPC .................................... 73/862.627, 862.474
  See application file for complete search history.

(56) References Cited

U.S. PATENT DOCUMENTS

| | | | | |
|---|---|---|---|---|
| 2011/0000313 A1* | 1/2011 | Eckhardt | ................ | A61M 5/14 |
| | | | | 73/861.61 |
| 2011/0000318 A1* | 1/2011 | Bradley | ................... | G01L 1/18 |
| | | | | 73/862.68 |
| 2012/0042734 A1* | 2/2012 | Wade | .................... | G01L 9/0052 |
| | | | | 73/862.381 |
| 2012/0152037 A1* | 6/2012 | Wade | ........................ | G01L 1/18 |
| | | | | 73/862.627 |
| 2013/0247689 A1 | 9/2013 | Thanigachalam et al. | | |
| 2013/0247690 A1* | 9/2013 | Wade | .................... | G01L 9/0052 |
| | | | | 73/862.632 |
| 2015/0128729 A1* | 5/2015 | Wade | ........................ | G01L 1/18 |
| | | | | 73/862.632 |

OTHER PUBLICATIONS

International Search Report, PCT/US2014/058584, dated Jan. 20, 2015, 2 pages.
Written Opinion of the International Searching Authority, PCT/US2014/058584, dated Jan. 20, 2015, 5 pages.
International Preliminary Report on Patentability, PCT/US2014/058584, dated May 3, 2016, 6 pages.
Communication pursuant to Rule 161(1) and 162 EPC, Europe Patent Application No. 14784576.2, dated Jun. 7, 2016, 2 pages.

* cited by examiner

FORCE SENSOR WITH GAP-CONTROLLED OVER-FORCE PROTECTION

CROSS-REFERENCE TO RELATED APPLICATIONS

This application is the national stage application of and claims to International Application Serial No. PCT/US2014/058584, filed on Oct. 1, 2014, and entitled "FORCE SENSOR WITH GAP-CONTROLLED OVER-FORCE PROTECTION", which claims priority to U.S. Provisional Patent Application Ser. No. 61/897,389 filed on Oct. 30, 2013 entitled "FORCE SENSOR WITH GAP-CONTROLLED OVER-FORCE PROTECTION", both of which are incorporated herein by reference in their entirety.

TECHNICAL FIELD

Various embodiments relate generally to force sensors, and more specifically to force sensors having mechanical deflection limiters to protect microelectronic sensors.

BACKGROUND

Force sensors are widely used in the many arenas of today's high-technology world. Force sensors are used in advanced robotics to provide an electrical signal in response to a force. Such robots may use force sensors to provide feedback to a processor as to a force applied by a moving mechanism under robot control. But force sensors may also be used to provide feedback to a processor as to a force applied externally to a robot. For example, if a member of a robot is moved, it may bump an external object. A force sensor may be used to provide a robot with an anthropomorphic sense of touch, for example.

Force sensors are also used in many medical devices as well. In many applications, force sensors are used to measure the flow of a fluid. For example, two force sensors may be positioned on either side of a restriction in compliant tubing. When fluid flows through the compliant tubing, the pressure of the fluid creates a force on the tubing which the force sensor can detect when in contact with the tubing. When a liquid is flowing through the tube, a pressure differential may result from the restriction between the two force sensors. This pressure differential may result in the downstream sensor reporting a smaller force than with no flow within the compliant tubing. The difference between the measured force of the upstream and the downstream force sensors may signify the flow rate of the fluid within the compliant tubing. Forces sensors may be used to measure the amount of medication administered to a patient from an IV bag, and the blood volume may be cleansed by a dialysis machine, for example.

SUMMARY

Apparatus and associated methods relate to a force sensor having flip-chip mounted force-sensing die having a force-sensing element fabricated on an unflipped top surface and an unflipped back surface being thinned so as to create a flexible diaphragm responsive to an externally applied force, wherein, when the force-sensing die is flipped and mounted, a predetermined space remains between the top surface of the force-sensing die and the mounting substrate it faces, the substrate presenting a deflection limitation for the deformation of the flexible membrane during a force event. In an illustrative embodiment, the force sensor may have a mechanical stop to precisely establish a predetermined deflection limitation. In some embodiments, the predetermined deflection limitation may advantageously limit the deflection of the flexible membrane so as not to deflect beyond a breaking point.

Various embodiments may achieve one or more advantages. For example, in some embodiments, a force-sensor may be reliably used in an environment where maximum applied forces are not well controlled. In some embodiments, a precise force sensor may be used where high external forces are possible. For example, an overforce-protected force sensor having high precision may be used in a situation where a large external force may be presented, wherein the large external force may be in excess of a damaging threshold for the same force-sensor but without overforce protection. In some embodiments, the force sensor may perform uniformly over a long time period, even if exposed to high applied forces. This longevity of performance may translate to lower costs of replacement, for example. In some embodiments, a sensitive force sensor may be stacked with a relatively insensitive sensor to provide a wide dynamic range combined with precise low-force measurements. In various embodiments, the size of the force sensor may be small. The small size may enable force sensors to be used in small available spaces, for example. In some embodiments, the force sensor may be packagable in tiny packages. A tiny-packaged force sensor may facilitate increased board-level functionality. Some embodiments may include signal conditioning circuitry. Some embodiments provide both front-side and back-side circuitry, which may reduce the size of the sensor. Various embodiments may provide temperature compensated force-sensing in a small package. In some embodiments, force sensors may be very accurate over a wide range of environmental conditions.

In various embodiments, an ability to measure the pressure of the fluid in the tubing may allow force sensors to provide feedback to medical pump systems of the fluid pressure, which may improve both proper delivery and patient comfort. Additionally, by measuring the fluid without contacting it, the sterility of the fluid may not be compromised. In some embodiments, the non-contact measurement of pressure of fluid may provide a solution which can be economically reused.

The details of various embodiments are set forth in the accompanying drawings and the description below. Other features and advantages will be apparent from the description and drawings, and from the claims.

DETAILED DESCRIPTION OF ILLUSTRATIVE EMBODIMENTS

To aid understanding, this document is organized as follows. First, with reference to FIGS. 1A-1C, an exemplary application of a gap-limited force sensor used in a medical setting is briefly described to introduce some of the benefits of overforce protection. Then, with reference to FIGS. 2A-2B, an exemplary force sensor with gap-controlled overforce protection and a mechanical stop will be used to describe various means of controlling a deflection limit. Continuing, with reference to FIGS. 3-5, discussion turns to exemplary overforce-protected force sensors using various force-transfer members. Finally, with reference to FIG. 6 exemplary plots of force-sensing die deflections in response to applied forces will be described and discussed.

Figure 1A:
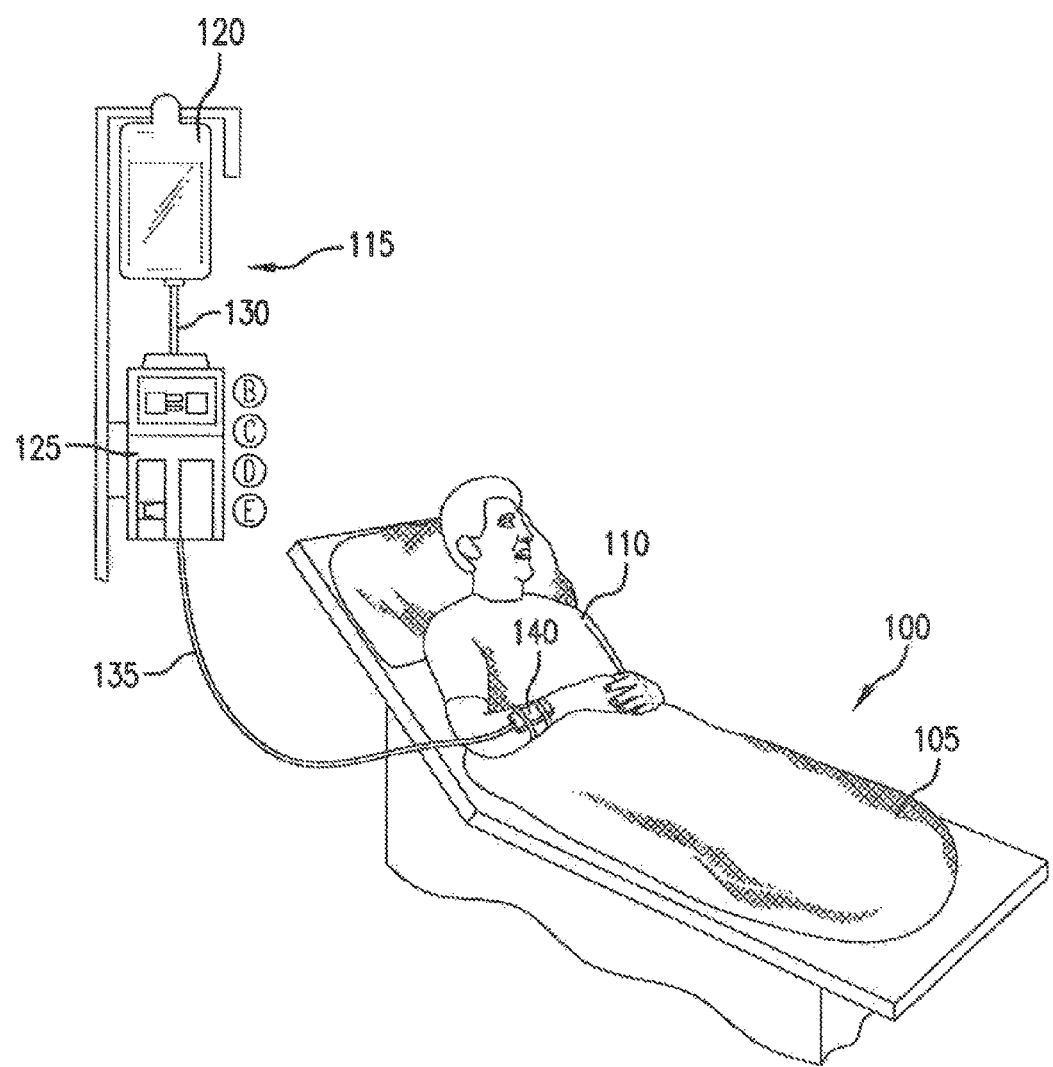
FIGS. 1A-1C depict an exemplary scenario in which a gap-limited force sensor is used to monitor the flow of medication into a patient.
Figure 1B:
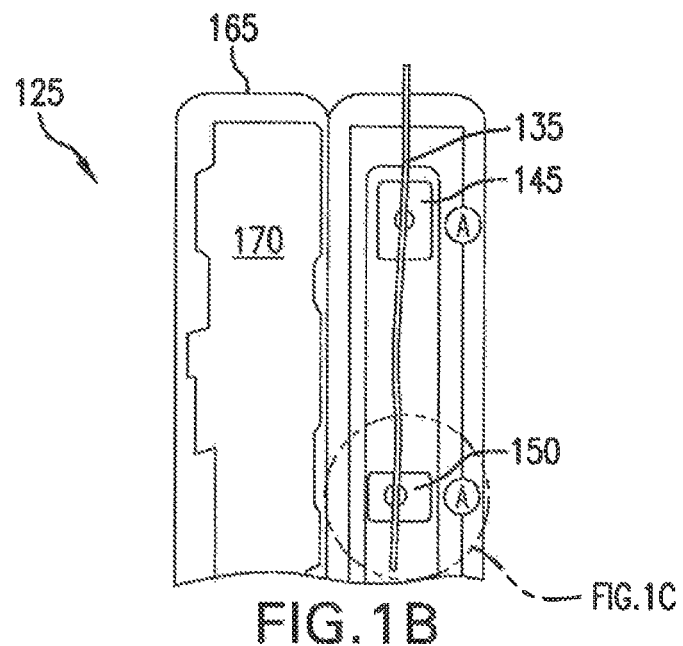
Figure 1C:
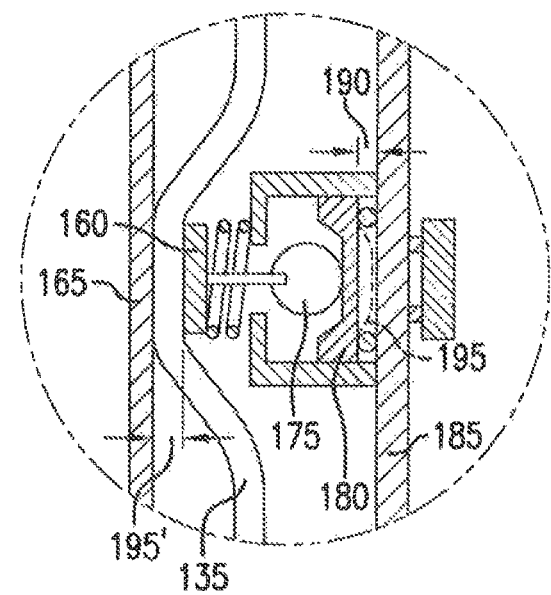

FIGS. 1A-1C depict an exemplary scenario in which a gap-limited force sensor is used to monitor the flow of medication into a patient. In FIG. 1A, a hospital setting 100 includes a gurney 105 upon which a patient 110 lies. Next to the gurney 105 is an Intra-Venus (IV) apparatus 115. The IV apparatus 115 has a medicine bag 120 connected to an infusion pump 125 via a tubing 130. A delivery tubing 135 carries the medicine from the infusion pump 125 to the patient 110, and delivers the medicine to the patient 110 via an intravenous connection 140. The infusion pump 125 may calculate the flow of medication by using two force sensors 145, 150, for example. A small difference between force measurements of the upstream force sensor 145 and the downstream force sensor 150 may indicate a flow rate of the medicine, for example. To make an accurate measurement, a pressure within the tubing 135 must be transferred to a force-sensing die 180 using a force-coupling plunger 160. In the depicted embodiment, the tubing 135 may be pressed toward a plunger 160 by a closing a door 165 making an inside surface 170 of the door press the tubing 135 into the plunger 160. An initial measurement from each force sensor 145, 150 may establish a zero-flow starting measurement. Then the infusion pump 125 may be turned on. The plunger 160 may then couple the force to a ball 175 situated above the force-sensing die 180. The force-sensing die may be mounted to the circuit board 185. A predetermined gap 190 between the force-sensing die 180 and the circuit board 185 may limit the amount of deformation to the force-sensing die 180, which may prevent the force-sensing die 180 to deform beyond a breaking point. In an exemplary embodiment, an amount of deflection 195 of the force-sensing die 180 is directly related to a compression amount 195' of the tubing 135.

In some embodiments, the infusion pump 125 may precisely measure a flow of the medicine to the patient 110. The infusion pump 125 may calculate the remaining medicine in the medicine bag 120 by integrating the flow from the time the medicine bag 120 was initially hung onto the IV apparatus 115. A precise calculation of the remaining medicine may enable the infusion pump 125 to signal when the medicine bag 120 requires replacing, for example. In some embodiments, a precise flow of medicine may provide safe delivery of dose rate to the patient 110, for example. In some embodiments, the tubing 135 may be coupled to the plunger 160 using a variety of means. The sensing die 180 may provide an electrical signal representative of the force sensed. The dosage of the medicine may require precise delivery. Sensitive force meters may be required to administer precise dosages. But in some embodiments, sensitive force meters may be delicate or breakable. Some embodiments of sensitive force meters may have very thin force-sensing dies. Such thin force-sensing dies may suffer catastrophic breakage in response to a small applied force. When an externally applied force is incident upon the force-sensing die 180, the sensor may deflect to a deflection limit 190 so as to contact the circuit board 185. Any external force greater than a predetermined deflection limited force may not further deform the force-sensing die 180.

Figure 2A:
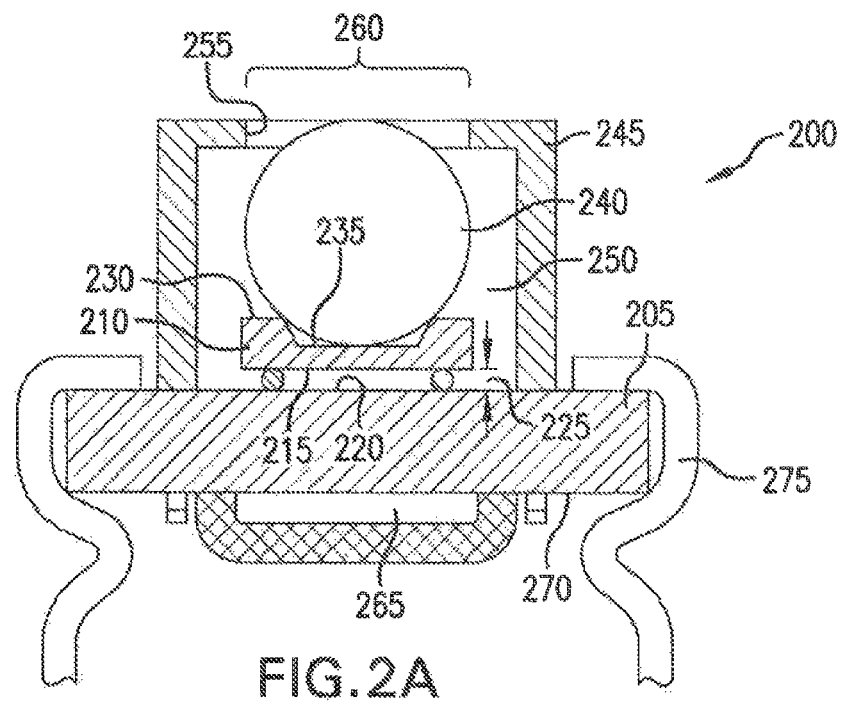
FIGS. 2A-2B depicts an exemplary force sensor with gap-controlled overforce protection.
Figure 2B:
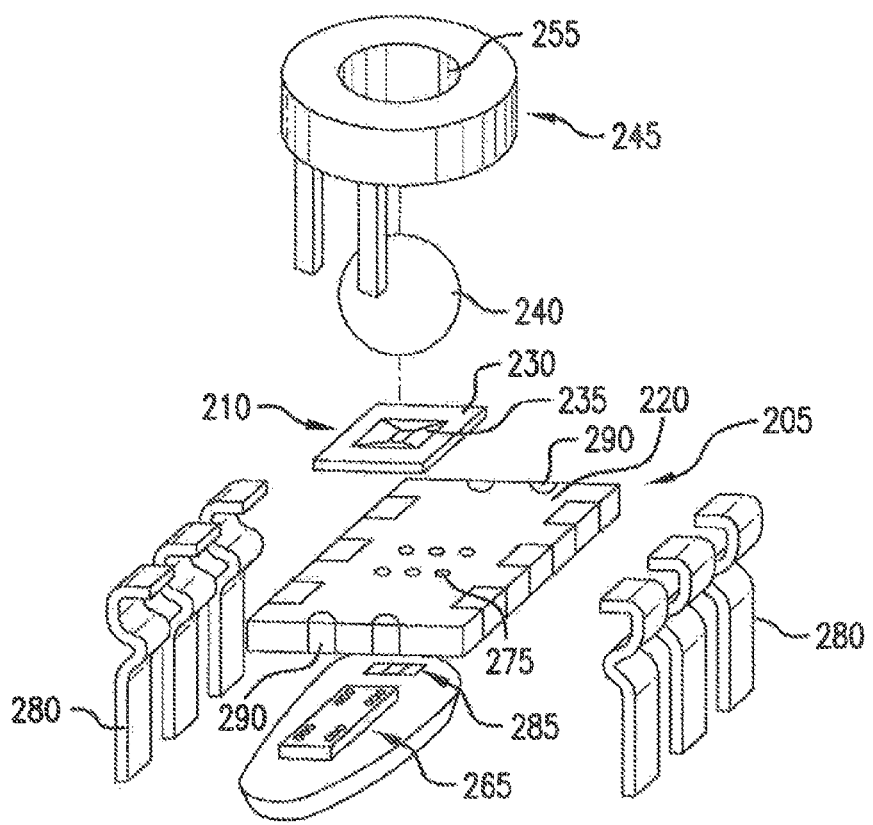

FIGS. 2A-2B depicts an exemplary force sensor with gap-controlled overforce protection. In the FIG. 2A and FIG. 2B embodiments, an exemplary force sensor 200 includes a substrate 205 upon which a sense die 210 is mounted. The sense die 210 may be flip-chip mounted to the substrate 205. The flip-chip mounting presents a microelectronic device side 215 of the sense dies 210 toward a topside 220 of the substrate 205. A deflection-limiting gap 225 formed between the device side 215 of the sense die 210 and the top side 220 of the substrate 205 separates the substrate 205 from the sense die 210. An exemplary micro-machined backside 230 of the sense die 210 may have a thinned backside region 235 which may facilitate die deformation in response to an applied force. A force-transfer member 240 may be located to contact the thinned backside region 235 of the sense die 210. In some embodiments, a cover 245 may capture the force-transfer member 240 within a cavity 250 of the force sensor 200. The cover 245 may have an aperture 255 through which a projecting surface 260 of the force-transfer member 240 may project therethrough.

In some embodiments, the substrate 205 may have both topside electrical connections and bottomside electrical connections. In the depicted embodiment, a signal conditioning die or chip 265 is mounted to a bottom side 270 of the substrate. In some embodiments, electrical connections between the signal conditioning chip 265 and the substrate 205 may be made using wire bonding. In an exemplary embodiment, electrical connections between the signal conditioning chip 265 and the substrate 205 may be made using flip-chip electrical connections. In some embodiments the bottomside electrical connections may be made using ball bonds, for example. In some embodiments, these electrical connections may be solder connections. In some embodiments, these electrical connections may be gold connections, for example. In the depicted embodiment, the substrate 205 has electrical through-hole connections 275 to provide electrical connectivity between the topside 220 and the bottom side 270 of the substrate 205. In some embodiments, electrical terminals 280 may be electrically connected to the substrate 205. Some embodiments may have multiple electrical components mounted to the substrate 205. In the depicted embodiment, a capacitor 285 is mounted to the bottom side 270 of the substrate 205.

In various embodiments, the through-hole manufacturing process may be used to self-align the cover 240 with the sense die 210. In some embodiments, through-holes may first be fabricated. Then selected through-holes 275 may be filled with a conducting material. The unfilled through-holes 290 may be used for mounting the cover 240 to the substrate 205. Then, some of the filled through-holes 275 may be used as connecting pads for making electrical connections to the sense die 210. In some exemplary embodiments, the connecting pads are electrically connected to the force-sensing die 210 near a peripheral region of the force-sensing die. In some embodiments, when the sense die 210 is mounted to the substrate 205, a solder reflow process may be used. The sense die 210 may align to the substrate 205 during the solder reflow process. In some embodiments, ThermoSonic Flip-Chip (TSFC) bonding may be used to electrically connect the sense die 210 to the substrate 205. Using such a bonding method may limit the temperature exposure of a die, for example. In some embodiments an adhesive may be used to mechanically couple the sense die 210 to the substrate 205. In some embodiments, the sense die 210 may be mechanically coupled to the substrate 205 by the electrical connection alone, without the need of an adhesive. In an exemplary embodiment, ThermoCompression bonding may be used to connect the sense die 210 to the substrate, for example. ThermoCompression bonding may permit both mechanical and electrical connection of the die to a substrate. In such a bonding method, additional adhesives may be avoided. The sense die 210 may be aligned to the through-holes fabricated during the through-hole fabrication process. In this way, a through-hole mounted cover 240 may be aligned to the sense die 210, as both cover 245 and sense die 210 are aligned to the same through-hole pattern. The cover 245 may in turn center the force-transfer device 240 within the cavity 250. This self-centering may improve manufacturing yield, for example.

Figure 3:
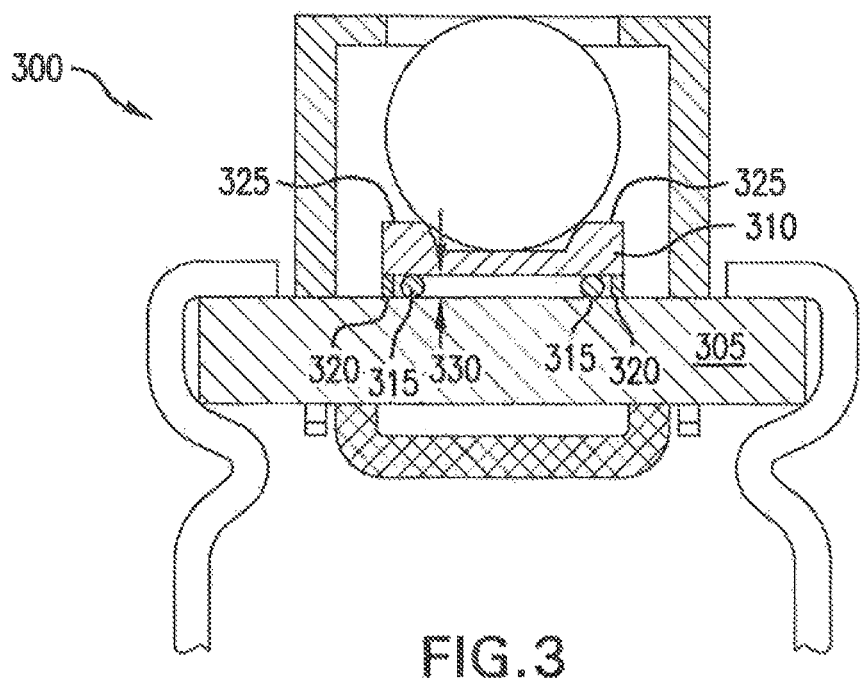
FIG. 3 depicts an exemplary overforce-protected force sensor with a mechanical stop member.

FIG. 3 depicts an exemplary overforce-protected force sensor with a mechanical stop member. In the FIG. 3 embodiment, an exemplary overforce-protected force sensor 300 includes a package substrate 305 and a force-sensing die 310. The force-sensing die 310 is mounted to the package substrate 305 in a flip-chip fashion. Electrical connections 315 provide electrical communication between the package substrate 305 and the force-sensing die 310. The depicted embodiment includes mechanical stops 320 positioned between a facing surface 325 of the force-sensing die 310 and a top surface 330 of the package substrate 305. The exemplary mechanical stops 320 may be located near a peripheral region 325 of the sense die 310. The mechanical stops 320 may have a predetermined height 330. The predetermined height 330 may be calculated to limit a deflection in response to an applied force, for example. The predetermined height 330 may be calculated to limit a deflection below a limit beyond which die breakage may result. In some embodiments, an assembly tool may have a stop feature that is used during the assembly of the sense die 210 to the substrate 205. After assembly, the stop feature, being attached to the tool, may be removed from the assembled substrate 210, for example.

In some embodiments, the mechanical stops 320 may provide electrical connectivity between the substrate 305 and the force-sensing die 310. In some embodiments, the mechanical stops may be integrally formed with either the substrate 305 or the force-sensing die 310. In some embodiments, the mechanical stops 320 are located near a peripheral region of the force-sensing die 310.

In an exemplary embodiment, a deflection limit exceeds a working range of the force-sensing die 310 while being within a proofed range of a displacement of the force-sensing die 310. For example, the predetermined height 330 may be greater than an operating range of the force-sensing die 310 such that the force-sensing die 310 may send a signal indicative of a maximum and/or minimum position and/or pressure without interference from engagement with the substrate 305. The predetermined height 330 may also be less than what would be required to cause the force-sensing die 310 to break, rupture, or crack due to an excessive deflection of the force-sensing die.

Various embodiments may use different methods of controlling the distance between the package substrate 305 and the force-sensing die 310. In some embodiments, the manufacturing parameters of the flip-chip mounting process may be used to control the mounting distance. In some embodiments, the size of the ball bond may determine the height of the force-sensing die 310 relative to the substrate 305. In some embodiments, the composition of the ball bond may factor into the mounting height. In an exemplary embodiment, the reflow parameters may control the resulting mounting height. For example, the reflow time and/or reflow temperature may affect the finished height of the mounted force-sensing die 310.

In some embodiments, a space element of predetermined height may be positioned beneath the force-sensing die 310. For example, a pin having a head may be pressed into a through-hole manufactured in the package substrate 305. A small screw may be screwed into the package substrate and present a head that defines a separation distance between the package substrate 305 and the force-sensing die 310, for example. In some embodiments, a spacer may be soldered to the packages substrate. In some embodiments, an adhesive may attach a spacing element to either the package substrate, the force-sensing die, or both. In an exemplary embodiment, the force-sensing die 310 may be set into a spacer carrier before the force-sensing die 310 is affixed to the package substrate 305.

Figure 4:
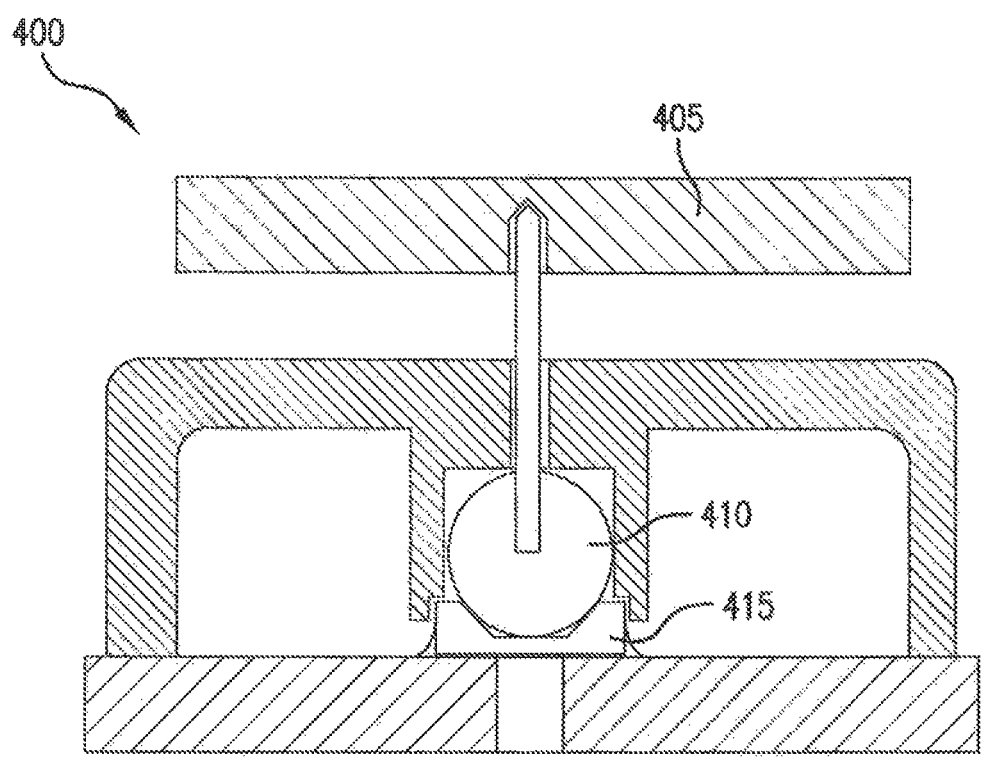
FIG. 4 depicts an exemplary deflection-limited force sensor having a plunger-type force-transfer member.

FIG. 4 depicts an exemplary deflection-limited force sensor having a plunger-type force-transfer member. In the FIG. 4 embodiment, an exemplary deflection-limited force sensor 400 includes a force-coupling plunger 405 and a force-coupling ball 410. The force-coupling members may transfer an externally applied force directed toward a force-sensing die 415 to the force-sensing die, for example. Various embodiments may have different types of force-transfer members. In some embodiments, a ball bearing may serve as a force-transfer member. In some embodiments a rod may serve as a force-transfer member. In some embodiments, a disk may be connected to a rod, the disk presenting a large surface area for making contact with a member from which force is to be measured. In the depicted embodiment, a plunger-type force-transfer member 405 is used in conjunction with a ball 410.

Figure 5:
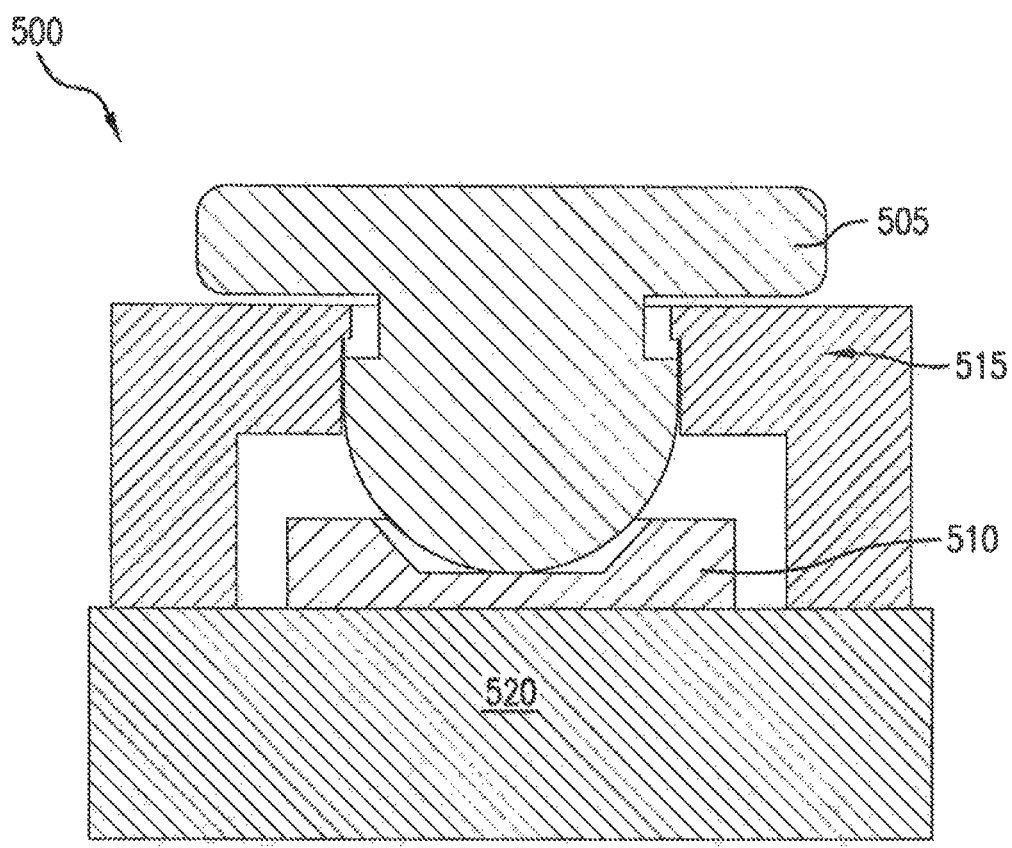
FIG. 5 depicts an exemplary deflection-limited force sensor having button-type force-transfer member.

FIG. 5 depicts an exemplary deflection-limited force sensor having a button-type force-transfer member. In the FIG. 5 embodiments, an exemplary deflection-limited force sensor 500 includes a button-type force-transfer member 505. In some embodiments, the force-transfer member may be preloaded so as to apply a force to a force-sensing die 510, even without an externally applied force to the force-transfer member. In some embodiments a spring may preload the force transfer member, for example. In the depicted embodiment, the force transfer member 505 is coupled to the force-sensing die 510 via a housing 515. The force-sensing die 510 is shown to be located a predetermined distance above a deflection-limiting substrate 520.

Figure 6:
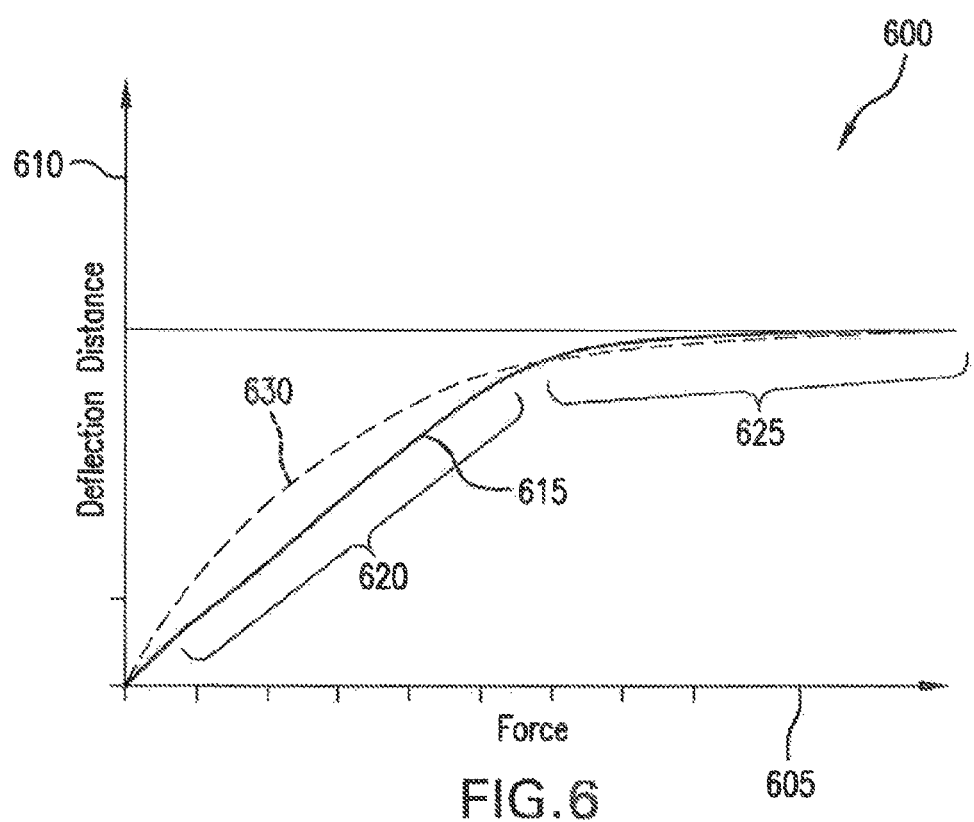
FIG. 6 depicts a graph showing an exemplary deflection distance of a membrane of a force-sensing die in response to an applied force.

FIG. 6 depicts a graph showing an exemplary deflection distance of a membrane of a force-sensing die in response to an applied force. In the FIG. 6 depiction, a graph 600 has a horizontal axis 605 re-presented an externally applied force. A vertical axis 610 represents a deflection distance of a membrane of a force-sensing die in response to an externally applied force. A functional relation 615 between the applied force and the deflection distance is depicted. The functional relation 615 has a linear region 620 and a deflection limited region 625. For small applied forces, the deflection distance of the membrane may deflect linearly in response to an applied forced as depicted in the functional relation 615. In some embodiments, the deflection distance of the membrane may deflect in a non-linear functional relation 630, for example.

In some embodiments, the backside topology of the force-sensing die may result in different deflection/applied-force relations. In some embodiments, the thinned region of a force die may be surrounded by a thick peripheral region. In some embodiments the thick peripheral regions of each of four sides of the force-sensing die may be substantially similar. In some embodiments, two opposite sides of a die may have a thick region that is dissimilar with the other two sides. This may result in asymmetric deformation on two different axes, for example. In some embodiments, perhaps no peripheral thickness will remain on two opposing sides to promote a substantially axial deformation of the die.

Although various embodiments have been described with reference to the Figures, other embodiments are possible. For example, in some embodiments, a signal may be generated to indicate that the membrane of the force sensor is in close proximity to the package substrate. In an exemplary embodiment, a capacitor may be made by manufacturing one plate on the deflecting surface of the force-sensing die and manufacturing a second plate on the top surface of the package substrate. In some embodiments a contact switch may close as one contact on the deflecting surface of the force-sensing die makes electrical contact with a second contact on the top surface of the package substrate.

In some exemplary embodiments, the bond pads between the force-sensing die and the package substrate are located at the corners of the force-sensing die. For example, by locating the bond pads at the corners the effects of the thermocompression bonds (i.e., flip-chip bonds on the sense die) on the sense die are minimized.

In an illustrative embodiment, a force-sensing device includes a package substrate having a plurality of die connecting pads on a top surface. In some embodiments, the force-sensing device may include a piezo-electric force-sensing die having a bottom interface and a substantially-planar top surface. In an exemplary embodiment, the substantially-planar top surface may have a plurality of electrical interconnects for connection to the plurality of connecting pads on the top surface of the package substrate. In some examples, the bottom interface may have a reduced thickness with respect to the top surface in a central region of the die. In some embodiments, the top surface of the force-sensing die may face the top surface of the package substrate and the plurality of electrical interconnects on the top surface of the force-sensing die may electrically connect to the plurality of connecting pads on the top surface of the package substrate. In some embodiments, the force-sensing device may include a force-transfer member in mechanical contact with the central region of the force-sensing die. In various embodiments, the central region of the die may deflect toward the top surface of the substrate in response to a force applied to the force-transfer member and directed toward the force-sensing die. In some examples, when the applied force exceeds a predetermined value, the top surface of the package substrate may limit deflection of the top surface of the force-sensing die such that the force-sensing die is not deflected beyond a breaking point.

In some exemplary embodiments, the substrate may prevent the force-sensing die from being deflected beyond a predetermined point due to contact of the adjacent surface of the force-sensing die with the adjacent surface of the substrate. In some embodiments, the predetermined point may be a maximum or minimum pressure allowed for a fluid through a tubing. For example, a physical interaction of the force-sensing die with the substrate may limit a movement of the force transfer member which may limit further expansion of a tube carrying a fluid due to, in part, a pressure applied to the sidewall of the tubing. In some exemplary embodiments, a predetermined point may correlate with a breaking or fracturing point of the force-sensing die. In other exemplary embodiments, a predetermined point may correlate to a stressing point of the force-sensing die, such as for example just before the force-sensing die begins to fracture and/or break.

In various embodiments, various means for limiting a deflection of a force-sensing die may be obtained. For example, some embodiments may control a separation distance between the force-sensing die and a package substrate. In some embodiments, the separation distance may be controlled by a flip-chip die attach process. For example, various parameters of a flip-chip die attach process may be controlled to control a finished solder bump interface that separates the force-sensing die from the package substrate. By way of example and not limitation, some such parameters are composition and size of the solder bumps, and time and temperature of the die attach process.

In some embodiments, a mechanical spacer may be interposed between the top surface of the force-sensing die and the top surface of the package substrate. The mechanical spacer may establish a separation distance between the (op surface of the force-sensing die and the top surface of the package substrate, for example. In some embodiments, a mechanical space may interposed between the force-sensing die and the substrate at a periphery of the force-sensing die. In an exemplary embodiment, a mechanical spacer may be interposed between adjacent solder bumps at the periphery of the force-sensing die, for example. The mechanical spacer may be placed before a solder reflow attachment operation is performed. As the solder reflows, the die may be drawn toward the package substrate until the mechanical spacer is engaged therebetween.

In some embodiments, a deflection limit may be predetermined based on a force signal level vs. deflection relation. For example, an application may require the measurement of applied forces up to a predetermined maximum. A deflection corresponding to the maximum force may be used in determining the maximum deflection limit. By way of example and not limitation, a maximum deflection level may be about 1.1, 1.2, 1.25, 1.33, 1.5, 1.74, 2, or about 3 times the deflection that corresponds to the maximum force.

In some embodiments, a deflection limit may be predetermined based upon a die breakage vs. deflection relation. For example, a force-sensing die may break at a corresponding amount of deflection. A predetermined deflection limit may be established to prevent deflection that would result in the force-sensing die to break. By way of example and not limitation, the maximum deflection limit may be about 0.9, 0.8, 0.75, 0.66, 0.5, or about 0.25 of the deflection that would result in the force-sensing die to break.

In some embodiments yield considerations may be used to find a predetermined deflection limit. For example, statistical analyses may be performed to establish a distribution of an amount of deflection that results in breakage of a force-sensing die. A predetermined deflection limit may be established to prevent the yield from descending below an acceptable amount. By way of example and not limitation, the predetermined threshold may be selected such that the deflection limit is about 3, 3.5 4, 4.5, or about 6 standard deviations away from a mean breakage deflection for a particular force-sensing die design.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A force-sensing die comprising:
a package substrate having a plurality of die connecting pads on a top surface;
a piezo-electric force-sensing die having a bottom surface and a substantially-planar top surface, the substantially-planar top surface having a plurality of electrical interconnects for connection to the plurality of connecting pads on the top surface of the package substrate, the force-sensing die has a reduced thickness between the bottom surface and the substantially-planar top surface in a central region of the force-sensing die, wherein the substantially-planar top surface of the force-sensing die is facing the top surface of the package substrate and the plurality of electrical interconnects on the substantially-planar top surface of the force-sensing die are electrically connected to the plurality of connecting pads on the top surface of the package substrate;
a force transfer member in mechanical contact with the central region of the force-sensing die, wherein the central region of the force-sensing die deflects toward the top surface of the substrate in response to an applied force applied to the force transfer member and directed toward the force-sensing die; and
a signal-conditioning die having a plurality of electrical interconnects for connection to a plurality of connecting pads on a bottom surface of the package substrate;
wherein when the applied force exceeds a predetermined value, the top surface of the package substrate limits deflection of the substantially-planar top surface of the force-sensing die through contact between the top surface of the package substrate and the top surface of the force-sensing die such that the force-sensing die is not deflected beyond a predetermined deflection limit.

2. The force-sensing die of claim 1, wherein the die connecting pads are electrically connected to the force-sensing die via a solder connection.

3. The force-sensing die of claim 2, wherein the solder connection determines the predetermined deflection limit between the top surface of the substrate and the substantially-planar top surface of the force-sensing die.

4. The force-sensing die of claim 1, wherein the force-sensing die further comprises a mechanical stop that sets a distance between the top surface of the substrate and the substantially-planar top surface of the force-sensing die.

5. The force-sensing die of claim 4, wherein the mechanical stops are located near a peripheral region of the force-sensing die.

6. The force-sensing die of claim 1, wherein the predetermined deflection limit is selected to be up to three standard deviations below a mean breaking point of the force-sensing die.

7. The force-sensing die of claim 1, wherein the force-sensing die is electrically connected with the substrate by flip-chip bonding.

8. The force-sensing die of claim 1, wherein the substrate includes a plurality of through-holes for attachment of a cover, wherein the cover is adapted to retain and center the force transfer member.

9. A force-sensing die comprising:
a package substrate having a plurality of the connecting pads on a top surface;
a piezoelectric force-sensing die having a bottom surface and a substantially-planar top surface, the substantially-planar top surface having a plurality of electrical interconnects for connection to the plurality of connecting pads on the top surface of the package substrate, the force-sensing die has a reduced thickness between the bottom surface and the substantially-planar top surface in a central region of the force-sensing die, wherein the substantially-planar top surface of the force-sensing die is facing the top surface of the package substrate and the plurality of electrical interconnects on the substantially-planar top surface of the force-sensing die are electrically connected to the plurality of connecting pads on the top surface of the package substrate; and
a force transfer member in mechanical contact with the central region of the force-sensing die, wherein the central region of the force-sensing die deflects toward the top surface of the substrate in response to an applied force applied to the force transfer member and directed toward the force-sensing die;
wherein when the applied force exceeds a predetermined value, the top surface of the package substrate limits deflection of the substantially-planar top surface of the force-sensing die through contact between the top surface of the package substrate and the top surface of the force-sensing die such that the force-sensing die is not deflected beyond a breaking point.

10. The force-sensing die of claim 9, wherein the die connecting pads are electrically connected to the force-sensing die via a solder connection.

11. The force-sensing die of claim 10, wherein the solder connection controls a deflection distance between the top surface of the substrate and the substantially-planar top surface of the force-sensing die.

12. The force-sensing die of claim 9, wherein the force-sensing die further comprises a mechanical stop that sets a distance between the top surface of the substrate and the substantially-planar top surface of the force-sensing die.

13. The force-sensing die of claim 12, wherein the mechanical stops are located near a peripheral region of the force-sensing die.

14. The force-sensing die of claim 9, including a signal-conditioning die having a plurality of electrical interconnects for connection to the plurality of connecting pads on the bottom surface of the package substrate.

15. The force-sensing die of claim 9, wherein the force-sensing die is electrically connected with the substrate by flip-chip bonding.

16. A force-sensing die comprising:
a package substrate having a plurality of die connecting pads on a top surface;
a piezo-electric force-sensing die having a bottom surface and a substantially-planar top surface, the substantially-planar top surface having a plurality of electrical interconnects for connection to the plurality of connecting pads on the top surface of the package substrate, the force-sensing die has a reduced thickness between the bottom surface and the substantially-planar top surface in a central region of the force-sensing die, wherein the substantially-planar top surface of the force-sensing die is facing the top surface of the package substrate and the plurality of electrical interconnects on the substantially-planar top surface of the force-sensing die are electrically connected to the plurality of connecting pads on the top surface of the package substrate; and a force transfer member in mechanical contact with the central region of the force-sensing die, wherein the central region of the force-sensing die deflects toward the top surface of the substrate in response to an applied force applied to the force transfer member and directed toward the force-sensing die;

means for limiting a deflection of the substantially-planar top surface of the force-sensing die through contact between the top surface of the package substrate and the top surface of the force-sensing die when the applied force exceeds a predetermined value.

17. The force-sensing die of claim 16, wherein the means for limiting the deflection comprises a solder bump.

18. The force-sensing die of claim 16, wherein the means for limiting the deflection comprises a mechanical spacer.

19. The force-sensing die of claim 16, wherein the means for limiting the deflection comprises means for controlling a separation distance between the top surface of the force-sensing die and the top surface of the package substrate.

20. The force-sensing die of claim 16, wherein the means for limiting the deflection comprises means for preventing breaking of the force-sensing die when the applied force exceeds the predetermined threshold.

* * * * *